United States Patent
Stahl

[15] 3,643,967
[45] Feb. 22, 1972

[54] SEALING RING FOR FACE SEALS
[72] Inventor: Filip Torvald Stahl, Alvsjo, Sweden
[73] Assignee: Stenberg-Flygt AB, Svetsarvagen, Solna, Sweden
[22] Filed: Feb. 4, 1969
[21] Appl. No.: 796,363

[30] Foreign Application Priority Data
Feb. 16, 1968 Sweden .............................. 2081/68

[52] U.S. Cl. ............................................................ 277/92
[51] Int. Cl. ..................................................... F16j 15/34
[58] Field of Search ............................. 277/92, 81, 96

[56] References Cited

UNITED STATES PATENTS 2,264,739  12/1941  Boden ............................... 277/92
2,425,209  8/1947   Snyder et al. ...................... 277/96
2,884,268  4/1959   Amirault et al. ................. 277/92 X
2,886,352  5/1959   Krellner ........................... 277/92 X
3,341,259  9/1967   Schultz et al. .................... 277/92 X Primary Examiner—Robert I. Smith
Attorney—Sughrue, Rothwell, Mion, Zinn & Macpeak

[57] ABSTRACT

A sealing ring for face seals comprises a supporting ring, a hard material ring and a rubber ring bonded both to the supporting ring and to the hard material ring, the hard material ring and the rubber ring being bonded to one side of the supporting ring whereby the supporting ring is capable of dissipating the heat of friction. The supporting ring has a substantially L cross-sectional shape and the hard material ring can be either ceramic or sintered carbide.

3 Claims, 5 Drawing Figures

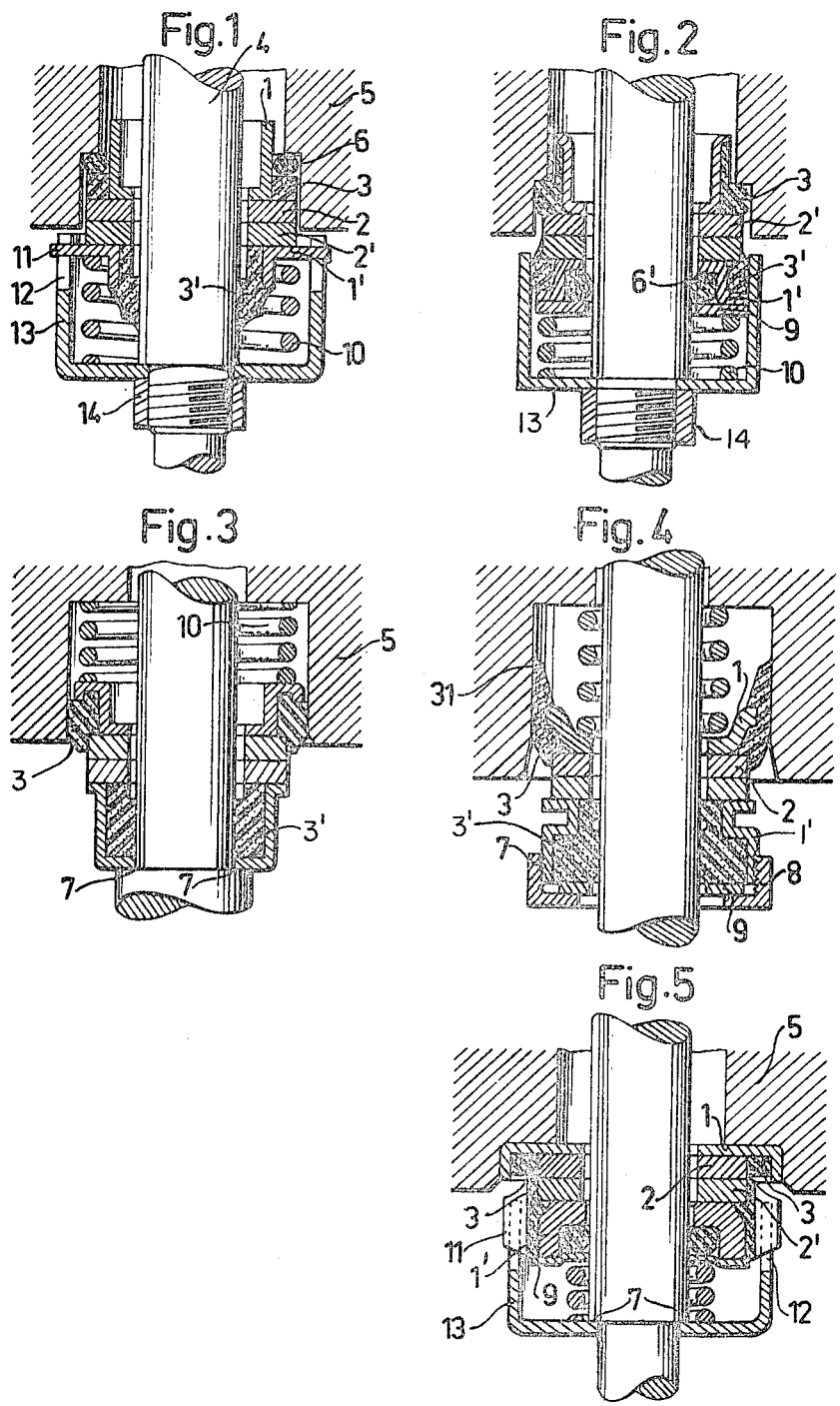

SEALING RING FOR FACE SEALS

The invention relates to sealing rings for face seals which are used, for example, when a seal is desired between a rotating shaft and a stationary housing, the primary seal being effected between a stationary sealing ring engaging with the stationary housing and another sealing ring engaging with the rotating shaft. Seals between the sealing rings and the associated stationary and rotating machine parts are in turn provided by means of secondary seals.

Among other materials used in such sealing rings for face seals are carbon, bronze, hardened steel, ceramics or sintered carbide. O-rings, sleeves, keys, bellows or the like are usually used as secondary seal between the sealing rings. If the material used in the sealing rings is carbon, bronze, or other material which can be turned, there is no great difficulty in achieving the manufacturing tolerances required for the primary and secondary seals. If the rings are made of hard materials, on the other hand, e.g., sintered materials such as ceramics or sintered carbide, the manufacturing tolerances will be fairly large owing to the variations produced in sintering. Turning of such sintered materials is at present not possible, but the rings must be ground in order to obtain the necessary tolerances. This grinding requires diamond wheels and is therefore very expensive.

The object of the present invention is to eliminate or at least greatly reduce the grinding work on such sealing rings, to save expensive sealing ring material, and to give sealing rings made of hard material as easily manufacturable a form as possible, preferentially a rectangular cross section.

This is achieved in accordance with the invention through the fact that the sealing ring is made of two parts which are placed in a vulcanizing mould and joined together by bonding to them a rubber ring, one part being the actual sealing ring of hard material, the other consisting of a filling and supporting part for the secondary seal. The secondary seal can advantageously be effected by means of the vulcanized rubber. A sealing ring according to the invention is thus characterized by a supporting ring, a hard material ring and a rubber ring bonded both to the supporting and to the hard material ring.

The advantages of this method of construction are that an easily manufacturable shape is used for the sintered hard material part, preferentially a rectangular or similar shape, and that the volume of the expensive sintered part is greatly reduced. The vulcanized connecting ring, furthermore, is admirably adapted for forming, for example, as lip seal or may be compressible in order to achieve driving or retaining of the sealing ring. Although sintered rings usually have large tolerances, the dimensional accuracy of the entire sealing ring unit will be at least equivalent to the case of an O-ring or sleeve placed on a ground or turned sealing ring.

The supporting ring may be made of drawn and punched sheet or may be turned. It may also be designed for dissipation of the heat of friction from the hard material ring and should therefore preferentially lie flush against the latter.

The invention and further developments of the same will now be described with reference to the attached drawing, which illustrates certain embodiments of the invention employed for face seals.

FIGS. 1 and 2 show embodiments of sealing rings according to the invention, partly combined with O-rings, FIG. 3 shows a special embodiment of the invention with the rubber ring used for driving, FIG. 4 shows a special embodiment of the invention with one rubber ring in the form of a lip seal and the other being axially compressible, FIG. 5 shows an embodiment of the invention with turned supporting ring, rubber ring with driver lugs and O-ring.

In all figures 1 denotes the supporting ring, 2 the hard material ring, and 3 the vulcanized rubber ring. The supporting ring 1 in each of the embodiments has a substantially L-shaped cross section. In all cases, furthermore, a rotating shaft 4 is assumed to be sealed to a stationary part 5, by means of a face seal, the sealing rings being of the form envisaged in the invention. By sealing ring is meant in this context and throughout the sequel a unit consisting of supporting ring, hard material ring, and rubber ring.

In the face seal in FIG. 1 the upper sealing ring has been supplemented by an O-ring which abuts both the stationary part 5 and the vulcanized rubber ring 3 of the sealing ring. This method of construction has certain advantages in that different grades of rubber can be used for rubber rings 3 and 6.

The lower sealing ring exhibits a supporting ring 1' with driver lugs 11 which slide into recesses 12 in a cover 13, which also contains a spring 10 for compression of the two hard material rings 2 and 2' of the face seal. The cover 13 is held in position by a threaded sleeve 14 on a threaded portion of shaft 4.

In the embodiment in FIG. 2 in the upper sealing ring a single rubber ring 3 takes over the function which, in the embodiment in FIG. 1, is performed by the O-ring 6 and the rubber ring 3 together. The supporting ring 1 has a substantially L cross-sectional shape with the bottom portion of the L-shaped ring extending radially inward towards a rotating shaft 4. Both the vulcanized rubber seal 3 and the hard material ring 2' are mounted on the outer side of the supporting ring. In the lower sealing ring, however, the O-ring 6' has been retained. But here the O-ring 6' and rubber ring 3' lie on different sides of the supporting ring 1': the O-ring 6' provides the seal between the shaft and the lower sealing ring by being compressed in an axial direction by a washer 9. The rubber ring 3' forms a seal between the hard material ring 2' and the supporting ring 1' on the one hand and the cover 13 on the other. Here, again, the cover is secured to the rotating part by a sleeve nut 14.

In the embodiment of FIG. 3 the spring 10 has been placed in the upper stationary part, the rubber ring 3 being made rather larger than the diameter of the drilled hole in the stationary part, whereby the upper sealing ring is secured in the peripheral direction. The lower sealing ring 3' is made with rather smaller inside diameter than the diameter of shaft 4 at shoulder 7. The lower sealing ring thus follows the rotation of the shaft. The shoulder 7 serves at the same time as abutment for the supporting ring of the lower sealing ring. This ensures fairly satisfactory dissipation of the heat of friction from the lower hard material ring via the supporting ring to the shaft.

In the embodiment in FIG. 4 the rubber ring 3 of the upper sealing ring has been made as a lip seal. This assumes a greater pressure above the face seal than below it in the drawing. This higher pressure presses lips 31 of the lip seal against the recess in the stationary part, so ensuring an increasing seal with increasing pressure as well as driving action.

The lower sealing ring in FIG. 4 also has a special form. The supporting ring 1' has an external thread 7 engaging with an internal thread, also denoted 7, in a cover nut 8. When the cover nut 8 is screwed onto the supporting ring 1', the rubber ring 3' is compressed axially by means of washer 9, so expanding radially, whereby the lower supporting ring can be held at an optional height on shaft 4 and with a force regulating regulatable according to the degree of tightening.

In the embodiment in FIG. 5 the supporting ring 1 of the upper sealing ring is inserted in the stationary part 5 by forced fit and, through its large contact surface, ensures excellent dissipation of the heat of friction generated between the hard material rings 2 and 2'. The lower rubber ring 3' forms a connection between the hard material ring 2' and a turned supporting ring 1'. The rubber ring 3' also has lugs 11 fitting into recesses 12 in the cover 13 for driving of the sealing ring. The cover 13 is here designed to be pressed against the annular shoulder 7 of the shaft 4 by a device not shown in the drawing. To compensate for the wear of the hard metal rings, one sealing ring is subjected—as in the other embodiments—to a spring force directed against the other sealing ring in the known manner.

One feature common to all embodiments shown is that the supporting ring 1 partially lies against the hard material ring 2. The supporting ring 1 and hard material ring 2 are bonded together by the rubber ring 3. This ring may consist of a suitable grade of rubber, primarily to form a reliable union between supporting and hard material rings, and be combined with an O-ring or other rubber ring consisting of a grade of rubber specially suited for sealing purposes. The rubber ring 3 may alternatively be formed in a special way and in such case, for example, replace extra sealing rings, driver devices and/or serve as lip seal. The function of the rubber ring together with the supporting ring, which may be made of drawn and punched sheet or be turned, is to compensate for the more or less inevitable manufacturing tolerances of the hard material ring. The hard material ring may thus have smaller volume and, furthermore, need only be ground on the surface which is to abut the sealing surface, e.g., another hard material ring.

The invention thus permits the manufacture of sealing rings of hard material of a new, advantageous form with saving of time, cost, and material.

What I claim is:

1. A unitary sealing assembly for sealing two concentric members that are in relative rotation comprising a supporting ring having substantially an L cross-sectional shape mounted on the outermost member with the bottom of the L-shaped ring extending radially inwardly towards the innermost member;

a rigid hard sintered material ring having a rectangular cross-sectional shape and providing a sealing surface, and a vulcanized rubber ring having a substantially rectangular cross-sectional shape for engaging one of the members in a sealing relationship along a surface of the rectangular portion, the hard sintered material ring being bonded to the supporting ring by the vulcanized rubber ring and located in contact with both the bottom of the L cross-sectional shape supporting ring and the lower rectangular cross-sectional rubber ring.

2. A unitary sealing assembly as in claim 1 where the hard sintered ring material is ceramic.

3. A unitary sealing assembly as in claim 1 where the hard sintered ring material is sintered carbide.

* * * * *